Dec. 23, 1952 E. IVENS ET AL 2,623,124

INTERCOMMUNICATION TELEPHONE SYSTEM

Filed Dec. 2, 1949 4 Sheets-Sheet 1

INVENTORS
EDGAR IVENS
HARRY G. WALL
BY Paul Kolisch
ATTORNEY

INTERCOMMUNICATION TELEPHONE SYSTEM

Filed Dec. 2, 1949

INVENTORS
EDGAR IVENS
HARRY G. WALL
BY Paul Kolisch
ATTORNEY

Dec. 23, 1952 E. IVENS ET AL 2,623,124

INTERCOMMUNICATION TELEPHONE SYSTEM

Filed Dec. 2, 1949 4 Sheets-Sheet 3

INVENTORS
EDGAR IVENS
HARRY G. WALL
BY Paul Kolisch
ATTORNEY

INTERCOMMUNICATION TELEPHONE SYSTEM

Filed Dec. 2, 1949 4 Sheets-Sheet 4

INVENTORS
EDGAR IVENS
HARRY G. WALL
BY Paul Kolisch
ATTORNEY

Patented Dec. 23, 1952 2,623,124

UNITED STATES PATENT OFFICE 2,623,124

INTERCOMMUNICATION TELEPHONE SYSTEM

Edgar Ivens, Stanmore, and Harry G. Wall, London, England, assignors to Modern Telephone Corporation, New York, N. Y., a corporation of New York Application December 2, 1949, Serial No. 130,624

21 Claims. (Cl. 179—1)

This invention has to do with intercommunicating telephone systems in which master, staff, or substations can be interconnected with or without the interposition of an amplifier and in which a plurality of substations can be paged via the amplifier.

The features of the invention will more clearly appear from the following description and the appended claims. In the drawings Fig. 1, left hand portion, is a circuit diagram of a master station, and the right hand portion, a staff station;

Figure 1:
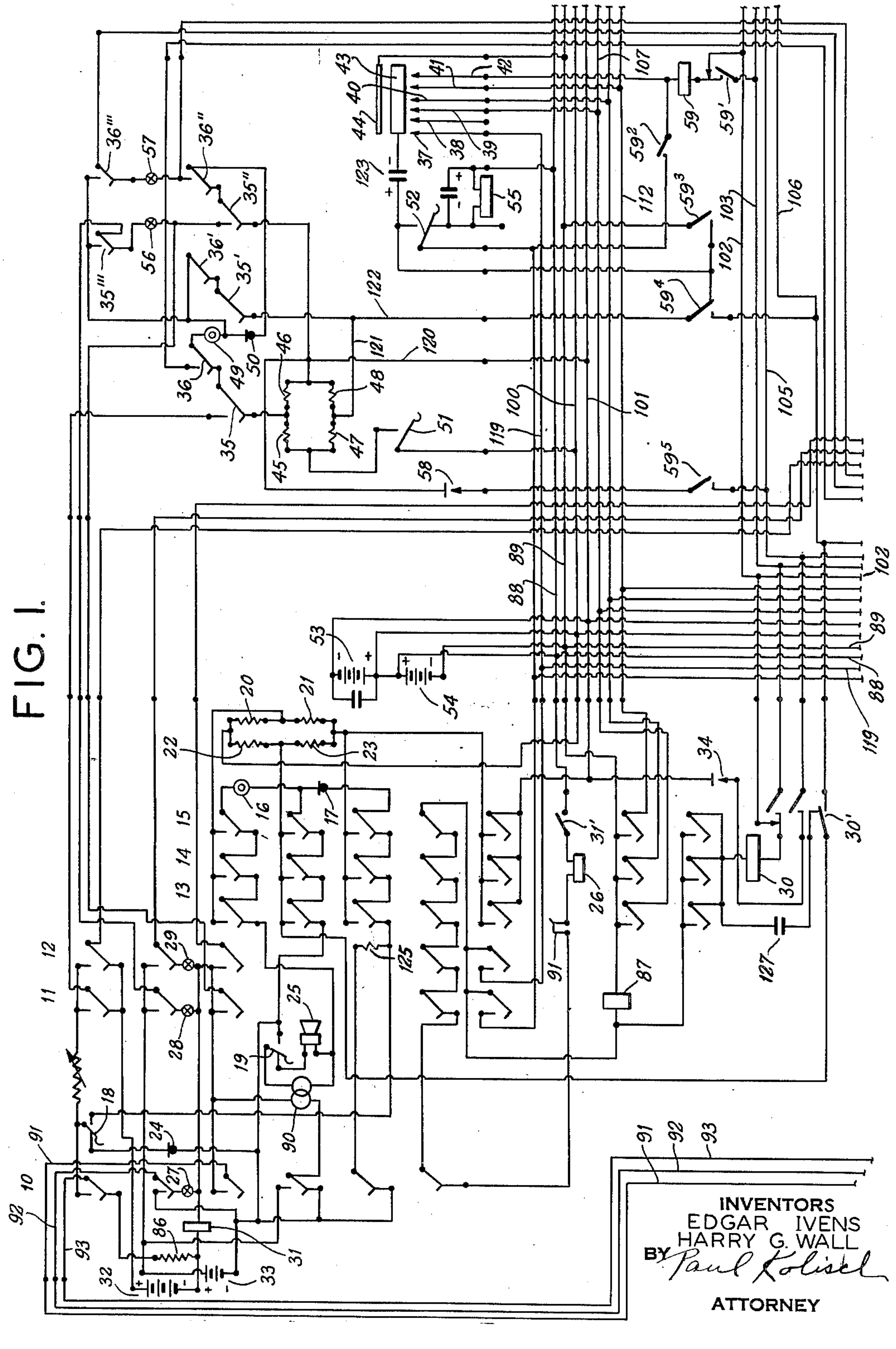
Figure 2:
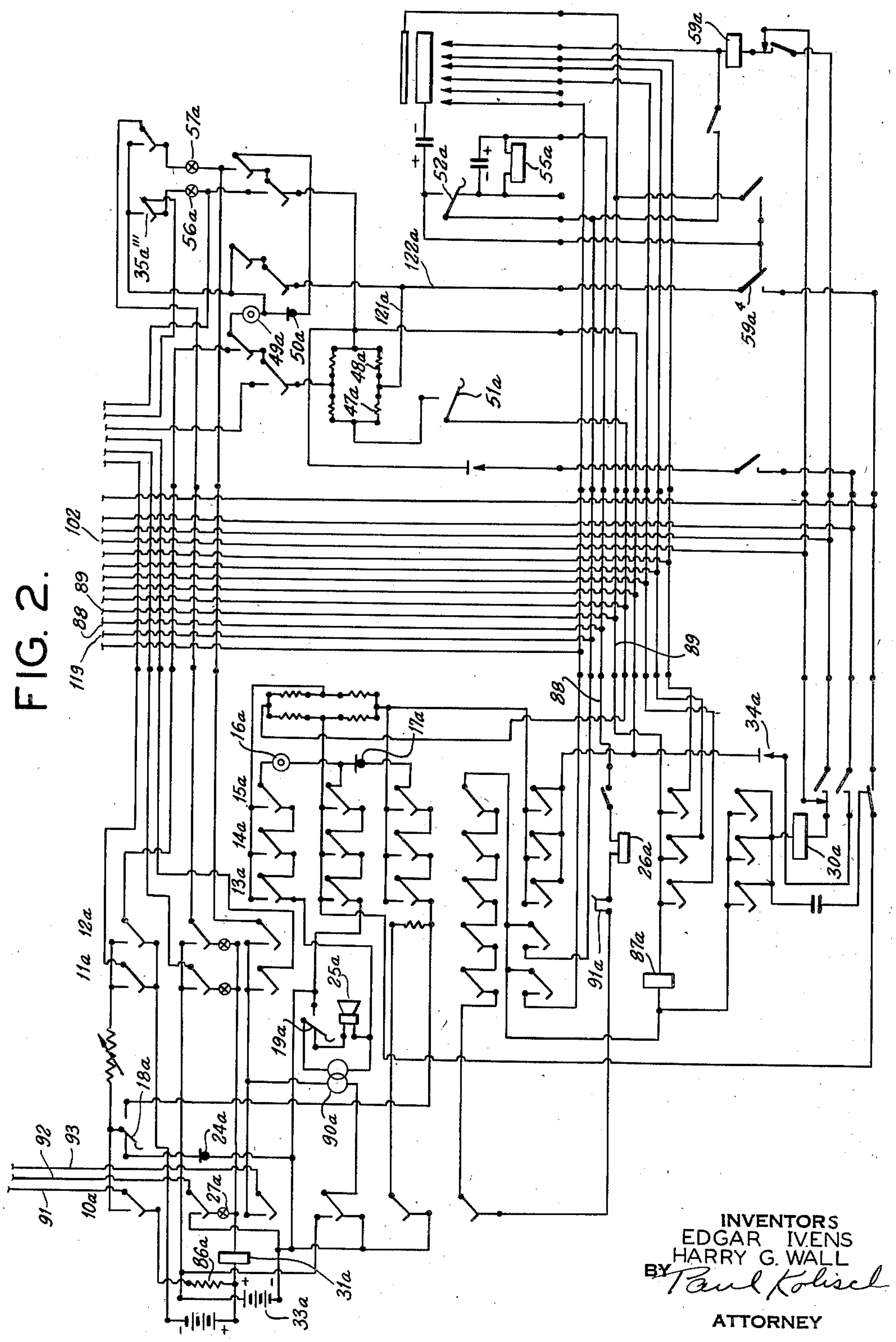
Fig. 2 shows another master and staff station.
Figure 3:
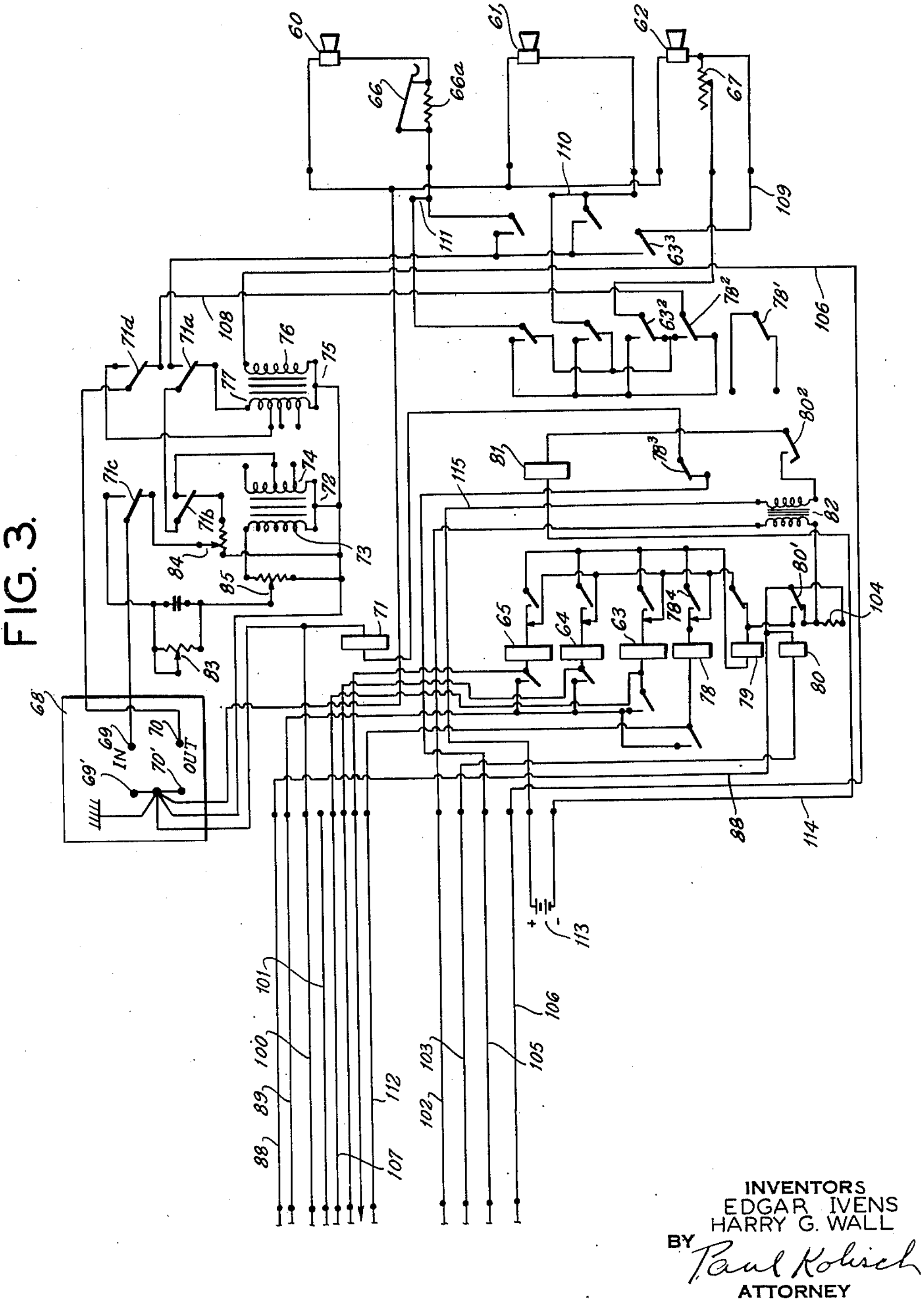
Fig. 3 is a diagram of three substations, and common switching and amplifying equipment for all stations of Figs. 1–3.

Each master station is equipped with a plurality of selector keys. The master station shown in Fig. 1 has six keys, 10, 11, 12, 13, 14 and 15. Each key has a certain number of movable blades or contact elements shown in vertical alignment which cooperate with make and break contacts. The keys, as well as all other equipment, are shown in Figs. 1 to 3 in the normal or unactuated condition. In order not to burden the drawing with too many reference numerals, we shall refer to the key contacts by a single numeral and identify the position of the movable contact counting from top to bottom. For instance, the top blade of key 10 will be referred to as the first blade of key 10, the next one as the second blade of key 10, etc., down to the sixth blade of key 10, and these key blades will be referred to as cooperating with their break contacts, those normally closed, and make contacts, those closed when the key is displaced from the position shown. The corresponding keys of the master station in Fig. 2 are arranged in the same manner as the keys of the master station in Fig. 1.

The master station is provided with a handset comprising a receiver 16 and a transmitter 17 which normally rests on a cradle and maintains a switch having blades 18 and 19 in the position shown. The handset, as well as other telephone equipment at the master station, may be connected with a talking circuit via a talking bridge, consisting of two 220 ohm windings 20 and 21, a 150 ohm winding 22, and a 470 ohm winding 23. Furthermore, the master station has a fixed microphone or transmitter 24 and a permanent magnet loudspeaker 25 and at the master station a buzzer or audible signal 26, visual or lamp signals 27, 28, 29, a control relay 30, a signal relay 31 and a 10½ volt signalling battery 32, a 9 volt talking battery 33, a talk-listen switch 34, and various other switches, resistors and other elements to which reference will be made in connection with the description.

Wherever it is necessary to refer to the second master station shown in Fig. 2, the elements will be designated by the reference numeral corresponding to the one in Fig. 1 with the suffix *a*. The same procedure will be followed to designate elements of the staff stations shown in Figs. 1 and 2.

The keys of the master station, once depressed, remain in that position until they are restored by hand to normal. Each staff station is equipped with two keys having a plurality of blades and cooperating make and break contacts. One of these keys has blades 35, 35′, 35″ and the other key 36, 36′, 36″, and 36‴. There is another set of keys at each staff station. These keys are diagrammatically indicated at 37, 38, 39, 40, 41 and 42 as movable contacts, which may be brought into contact with bus bars 43 and 44. The keys 37—42 are so arranged that whenever a key is brought into contact with bus bar 43, it remains locked in that position until another one of the keys is depressed or until the conversation is terminated and the staff station hangs up the handset. The keys may be pushed into an over-throw position to contact bus bar 44, but when the pressure is released, the keys will break contact with the bus bar 44 and remain locked in contact with bus bar 43. The conversation from a staff station is established via a speaking bridge comprising two 220 ohm resistors 45 and 46, 150 ohm resistor 47 and a 470 ohm resistor 48. The handset comprises a receiver 49 and a transmitter 50 which normally rest on a cradle, maintaining switches 51 and 52 in the position shown. Talking current is supplied from a battery 53 and ringing current from a battery 54 which are common to all the staff stations. A staff station may be signalled by means of an audible signal or buzzer 55 and by a plurality of visual signals 56, 57. Just as at the master station, the staff station is equipped with a talk-listen switch 58 and a control relay 59.

Each substation (Fig. 3) is equipped with a transducer acting either as a self-energizing transmitter or a permanent magnet loudspeaker 60, 61, 62. Each substation has a switching relay 63 for station 62, 64 for station 61 and 65 for station 60. The armatures and contact of these relays are shown substantially in alignment with the relay winding. Wherever it is necessary these relay armatures, just as well as all the other relay armatures to which reference will be made, will be designated by the same numeral as the relay winding to which a suffix will be added for distinguishing them from one another. One or more of the substations is equipped with a gravity switch 66.

One or more of the substations may be equipped with a volume control rheostat 67.

All the other equipment shown in Fig. 3 is common to all the stations. This common equipment comprises an amplifier 68 which comprises the usual amplifying tubes and input and output transformers, which are not illustrated in the drawings. Connection may be established with the amplifier via input terminals 69, 69', and output terminals 70, 70'. The input and output terminals 69' and 70' are connected together and to ground. The connection to the amplifier is controlled by a switching relay 71 via two transformers 72 and 75. The transformer 72 has a 60 ohm winding 73 which matches the impedance of the transformer windings provided in the amplifier and an inductively coupled second winding 74 which has various taps. The transformer 75 has a winding 77 of 60 ohms which again matches the impedance of the amplifier transformer. This winding has various taps. The second winding 76 of transformer 75 has an impedance of 75 ohms matching the impedance of the master station handset.

The common equipment comprises also a paging relay 78, a relay 79 common to all the substations and a busy relay 80. A busy condition of the common equipment is indicated by means of a buzzer 81 connected with the talking circuit via a transformer 82.

The volume of the amplifier may be controlled by volume control potentiometers 84, 85 and rheostat 83.

To call the master station shown in Fig. 2, a person at the master station shown in Fig. 1 actuates a key 10. This closes a circuit from the positive pole of the talking battery 33 via the make contact and fourth blade of key 10, a winding of transformer 90, the make contact and third blade of key 10, conductor 91 and then at the master station in Fig. 2, the first blade of key 10a, a 25 ohm resistor 86a, the winding of relay 31a, signal lamp 27a, the break contact of the second blade of key 10a, conductor 92, and then at the calling master station, the second blade of the key 10, the cooperating make contact and back to the negative pole of the talking battery 33. A relay 31a becomes energized and closes an energizing circuit for the buzzer 26a, at the master station which is called. This circuit may be traced from the positive pole of the ringing battery 54 provided in common for all the master stations, conductor 88, the make contact and armature of relay 31a, the buzzer 26a, normally closed hand operated contact 91a, then the normally closed contact of the sixth blade of key 10a and the normally closed contact of all the keys 11a, to 15a, thence the winding of choke coil 87a, conductor 89 and back to the negative pole of the ringing battery 54. The lighting of lamp 27a and the ringing of buzzer 26a will inform the master station in Fig. 2 that the master station shown in Fig. 1 is calling.

A talking circuit is now established between the two master stations. This talking circuit will now be traced.

The fixed transmitter 24 of the master station is connected in circuit via the normally closed contacts of the switch 18, thence the make contact and first blade of key 10, conductor 93, and then at the called master station, the third blade and make contact of key 10a (it being assumed that the second master station upon receiving the signals 27a depressed the key 10a representing the calling master station and, also, removes the telephone handset from its cradle, thus actuating the switches 18a and 19a); the primary winding of transformer 90a, the fourth blade and make contact of key 10a, positive pole of the master talking battery 33a, negative of the master talking battery 33a, make contact and second blade of the key 10a, conductor 92, second blade and make contact of the key 10, thence to the fixed transmitter 24. The receiver 16a of the called master station is connected across the secondary winding of the transformer 90a via the make contacts of the switch 19a, and the break contact and second blades of keys 13a, 14a, and 15a, the receiver 16a, the first blade and break contacts of keys 15a, 14a and 13a. This estblishes a talking circuit from the calling master station to the called master station.

The loudspeaker 25 at the calling master station is connected across the secondary winding of the transformer 90 via the break contact of the switch 19. The primary winding of the transformer 90 is connected in circuit via the make contact and third blade of key 10, conductor 91, and then at the called master station the make contacts and first blade of key 10a, the make contacts of the switch 18a, the break contacts and third blades of keys 13a, 14a and 15a, the handset transmitter 17a, the second blade and break contacts of keys 15a, 14a and 13a, the make contact and second blade of key 10a, conductor 92, then at the calling master station, the second blade and make contact of key 10 negative of the master talking battery 33. The positive of the master talking battery 33 is connected to the primary winding of the transformer 90 via the make contact and fourth blade of key 10.

This establishes a talking circuit from the called master station to the calling master station.

If the calling master station telephone handset 16, 17 is removed from its cradle, the switch 18 is actuated and the fixed transmitter 24 is disconnected in favor of the handset transmitter 17 via the make contact of switch 18, the break contacts and third blades of keys 13, 14 and 15, the handset transmitter 17 and the second blade and break contacts of keys 15, 14 and 13. The switch 19 is also actuated and the loudspeaker 25 is disconnected in favor of the handset receiver 16 via the make contact of the switch 19, the break contacts and second blades of keys 13, 14 and 15, receiver 16 and the first blade and break contacts of keys 15, 14 and 13.

If the called master station telephone handset 16a, 17a is replaced on its cradle the switches 18a and 19a are restored to normal and the receiver 16a and the transmitter 17a are switched out of circuit in favor of the loudspeaker 25a and fixed transmitter 24a which are connected in circuit via the break contacts of switch 18*a* and 19*a* as previously described for the calling master station loudspeaker 25 and fixed transmitter 24 via the break contacts of switches 18 and 19.

To call the master station shown in Fig. 1 the master station shown in Fig. 2 will depress the key 10*a*. This will close a circuit similar to that described previously for the master station in Fig. 1 to call the master station in Fig. 2.

Upon receipt of the audible and visual signals at the called master station the key 10 is depressed and a talking circuit is closed as previously described.

The master station shown in Fig. 1 as well as the master station shown in Fig. 2 is, of course, provided with as many keys like keys 10, 10*a* as there are master stations, with which it is desired to call. These keys have been omitted since it would unduly complicate the drawing. The manner in which they will be arranged in the circuit will be obvious to those skilled in the art in view of what is disclosed.

It will be noted that the circuit of the buzzer 26 at the master station is controlled not only in the make contacts of the relay 31, but in normally closed break contacts of the hand switch 91 and in break contacts of all the selector keys provided at the master station. Therefore, if the master station operates the hand operated switch 91 or if the master station is calling any other master, staff or substation, and therefore operates one of the selector keys, then the buzzer 26 cannot be operated and thus disturb the master station. However, when a call comes in from a master station, then the lighting of a lamp like 27, while the master station is busy, will indicate that a call is awaiting attention and leave it to the called master station whether to discontinue the conversation in which it is engaged and take the new call or to ignore the new call. Similarly, the calling by another staff station will be indicated to the master station by the lighting of lamps 28 or 29 and these the master station can receive or neglect.

The master station depresses the appropriate selector key, the selector key 11 provided for calling the staff station shown in Fig. 1 and the selector key 12 for calling the staff station shown in Fig. 2. For instance, if the key 11 is depressed, then circuits for buzzer 55 and calling lamp 56 are closed.

The circuit for buzzer 55 includes negative ringing battery 54, conductor 89, choke coil 87, the fifth blade and make contact of key 11, and at the staff station the break contacts of the switch 52, the winding of the buzzer 55, the conductor 88 to positive ringing battery 54.

The circuit for lamp 56 includes positive master talking battery 33, make contacts and second blade of key 11, and at the staff station the break contacts of key 35''', the lamp 56, and at the master station the third blade and make contact of key 11, the primary winding of the transformer 90, the fourth blade and break contact of key 10 to negative master talking battery 33.

Should the staff station be engaged when the master station calls, then only the lamp 56 will be lighted, since the circuit of the buzzer is interrupted at the break contacts of the switch 52 which is now actuated by virtue of the telephone handset 49, 50 being removed from its cradle.

In order to reply to the call from the master station, the telephone handset like 49, 50 at the staff station is removed from its rest and the key 35 which represents the calling master station is depressed. This will establish a talking circuit between the master station and the staff station via the telephone handset at the staff station and the loudspeaker and fixed transmitter 25 and 27, or telephone handset 16 and 17, at the calling master station. Positive master station talking battery 33, make contact and second blade of key 11, and at the staff station the blade and make contact 35''', receiver 49, the blade and break contact 36, blade and make contact 35, and at the master station the first blade and make contact of the key 11, break contacts of switch 18, fixed transmitter 24 to the negative master station talking battery 33. This provides the talking circuit from the master station to the staff station.

If the master station telephone handset 16 and 17 is removed from its cradle, the switch 18 is actuated and the fixed transmitter 24 is switched out of circuit in favor of the handset transmitter 17 via the make contacts of the switch 18, the break contacts and third blades of keys 13, 14 and 15, the transmitter 17 and the second blade and break contacts of the keys 15, 14 and 13. A 71 ohm resistor 125 is connected in parallel with the transmitter 17 via the break contacts and third blade of the keys, 13, 14, 15, the break contacts and fifth blade of the key 10, and the break contacts and second blades of keys 13, 14 and 15. Resistor 125 reduces the sensitivity of the handset transmitter 17 which is held in close proximity to the mouth when talking, whereas the fixed transmitter, being some distance from the mouth when talking, requires no such reduction.

Positive master talking battery 33, make contact and second blades of the key 11, and at the staff station the blade and make contact 35''', transmitter 50, the blade and break contact 36'', the blade and make contact 35'', and at the master station the third blade and the make contact of the key 11, the primary winding of the transformer 90, the fourth blade and break contact of key 10, to negative master talking battery 33. The master station loudspeaker 25 is connected to the secondary of the transformer 90 via the break contacts of the switch 19. This provides the talking circuit from the staff station to the master station.

If the telephone handset 16, 17 is removed from its cradle, the switch 19 is actuated and the loudspeaker 25 is switched out of circuit in favor of the handset receiver 16 via the make contacts of the switch 19, the break contacts and second blade of the keys 13, 14, and 15, the receiver 16 and the first blade and break contacts of the keys 15, 14 and 13.

In order to converse with two or three staff stations at the same time, i. e. to establish a conference call, the keys like 11 and 12 of all the staff stations that it is desired to call are depressed simultaneously, causing the actuation of audible and visual signals at all the staff stations. For instance, the circuits of the audible and visual signal for the two staff stations illustrated in Figs. 1 and 2 could be traced as follows:

The lamp circuit for station No. 1 includes positive master talking battery 33, make contact and second blade of key 11, the blade and break contact of 35''', the lamp 56, third blade and make contact of key 11, the primary winding of the transformer 90, fourth blade and break contact of the key 10 to negative master station talking battery 33.

The lamp circuit for station No. 2 includes positive master talking battery 33, make contact and second blade of key 12, blade and break contact of 35a''', the lamp 56a, third blade and make contact of key 12, primary winding of the transformer 90, fourth blade and break contact of the key 10 to negative master talking battery 33.

The buzzer circuit for staff station No. 1 is closed over, negative ringing battery 54, conductor 89, the choke coil 87, the fifth blade and make contact of key 11, and at staff station No. 1 the break contacts of the switch 52, the winding of the buzzer 55, conductor 88 to positive ringing battery 54.

The buzzer circuit for staff station No. 2 is closed over, negative ringing battery 54, conductor 89, the choke coil 87, the fifth blade and make contact of key 12, conductor 119 and at staff station No. 2 the break contacts of the switch 52a, the winding of the buzzer 55a, conductor 88 to positive ringing battery 54.

The conference calls are responded to in the same manner as above described, the master station using the loudspeaker 25 and fixed transmitter 24, and the staff stations the telephone handset. Of course, the telephone handset could be used at the master station also. At a conference with a large number of staff stations the handset must always be used.

If the staff station of Fig. 1 desires to call the master station of Fig. 1, key 35 is operated. Key 36 is operated to call the master station shown in Fig. 2. In the operation of the key, for instance key 35, a signalling circuit will be established between the calling staff station and the master station for actuating the visual signal 28 as well as the buzzer 26 at the master station over the following circuit: positive master signalling battery 32, the break contact and first blade of key 11, the make contact and blade 35, the break contact and blade 36, the winding of the receiver 49, the make contact and blade 35''', the second blade and break contact of key 11, the lamp 28, the winding of the relay 31 to negative master signalling battery 32.

The relay 31 is actuated and its contacts close to complete a circuit to the buzzer 26 as follows: negative ringing battery 54, conductor 89, the choke coil 87, the fourth blade and break contacts of the keys 15, 14, 13, 12 and 11, the sixth blade and break contacts of key 10, the hand-operated switch 91, the winding of the buzzer 26, relay 31 make contact 31', the conductor 88 to the positive ringing battery 54.

To call another staff station first a telephone handset 49, 50 is removed from its rest and the appropriate key, e. g. 37, is depressed into its overthrow position in which it makes contact with the bus bar 44. This will cause the actuation of an audible signal at the called staff station over a circuit which may be traced as follows: negative ringing battery 54, conductor 89, key 37 depressed to overthrow position 44, conductor 119 and at the staff station (Fig. 2), the break contacts of the switch 52a, the winding of the buzzer 55a, conductor 88 to the positive ringing battery 54. When the key is released to move back into its lock position in which contact with the bus bar 44 is broken but contact with the bus bar 43 is maintained, a talking circuit will be established between the calling and called staff stations, which will be traced as follows:

The positive pole of the talking battery 53 via conductor 100 and the make contact of the switch 51 to one diagonal point of the talking bridge 45, 46, 47 and 48 of the calling staff station No. 1. The opposite point of the diagonal of this bridge is connected via conductor 120, conductor 101 with the negative talking battery 53. The calling staff station talking bridge is thus energized.

The talking bridge of the called staff station No. 2 is also energized, as described above, when the called staff station switch 51a operates due to the removal of its telephone handset 49a and 50a.

When the calling staff station key 37 is released to move back into its locking position in which contact with the bus bar 44 is broken, but contact with the bus bar 43 is maintained, connection is established between the energized talking bridges as follows:

From a point common to 47 and 48 of the talking bridge of calling staff station No. 1, conductors 121, 122, break contact and blade $59^4$, condenser 123, bus bar 43, key 37, conductor 119, and at the called staff station No. 2, the make contacts of the switch 52a, the break contact and blade $59a^4$ conductors 122a, 121a to a point common to 47a and 48a of the called staff station No. 2.

If one of the staff stations desired to establish a connection with one of the substations, it will remove the handset 49, 50 from its rest, thus disconnecting the buzzer 55 in the contacts of the switch 52 and connecting the positive pole of the talking battery 53 via conductor 100 and the make contact of the handset switch 51 to one diagonal point of the talking bridge 45, 46, 47, 48 of the calling staff station. The opposite point of the diagonal of this bridge is connected via conductor 101 with the negative pole of the talking battery 53. The calling staff station will depress key 42 past to its intermediate position in which it engages and is locked by the bus bar 43. In other words, that the key 42 must be moved into its overthrow position. In this position, and only in this position, can we trace the circuit from negative pole of the ringing battery 54, the conductor 89, the bus bar 44, key 42, the winding of relay 59, the normally closed contacts of this relay, conductor 102, the secondary winding of the transformer 82 in the common equipment, the normally closed break contacts of relay 80, thence via conductor 88, back to the positive pole of ringing battery 54. Assuming that the common equipment is idle, the relay 59 will become energized and this relay will lock its winding via its armature to the conductor 103 which extends over the winding of relay 80, back through conductor 88 to the positive pole of the battery. Not only will relay 59 be locked up in this circuit, but relay 80 will also energize and by attracting its armature 80' which will remove the normally closed shunt around a 1000 ohm resistor 104. Therefore, if another staff station or master station attempts to make a call via the common equipment shown in Fig. 3, its relay, corresponding to 59, will encounter this high resistor 104 and will therefore not operate. The relay 80 also closes an energizing circuit for the high frequency buzzer 81 from the negative pole of a 3/4½ volt battery 113, conductor 114, the high frequency buzzer 81, outer armature $80^2$ and make contact of relay 80, the primary winding of the transformer 82, conductor 115 to the positive pole of battery 113. Whenever the key 58 is depressed, it will connect the negative pole of talking battery of 53 via conductor 101, switch 58, armature $59^5$, and make contact, conductor 105, break contact and right-hand middle armature $78^3$ of relay 78, winding of relay 71 brought to the positive pole of the talking battery 53 over conductor 100, to switch the input and output connections of the amplifier, as will be explained below. The armature $59^4$ of the control relay, connects the speaking bridge of the calling staff station to the conductor 106 and is connected to one terminal of the high reactance winding 76 of transformer 75 (Fig. 3). The other end of this winding is grounded at amplifier 68.

When key 42 is released negative battery 54 is connected to the winding of relay 59; negative pole of ringing battery 54, conductor 89, make contact and armature $59^3$, make contact switch 52, make contact and armature $59^2$, winding of relay 59.

The calling party at the staff station now depresses the substation selecting key. In the present case it will be assumed that key 39 is closed to the overthrow position to contact bus bar 44. This will release key 42 which was first operated, but relay 59 will remain energized over its locking circuit. A circuit will be closed from the negative pole of the ringing battery via conductor 89, bus bar 44, key 39, conductor 107, winding of substation relay 63, the normally closed contacts of this substation relay, thence the armature and normally closed contact of relay 79, the make contact and armature 80′ of relay 80, to conductor 88 and back to the positive pole of ringing battery 54.

Relay 63 will become energized and lock up through its first right hand armature and front contact and thence over the winding of relay 79, front contact and armature $80^1$ of relay 80, conductor 88, to positive pole of battery 54. Relay 79 is also energized in this circuit.

Loudspeaker 62 has two branches over which connection can be made respectively to the output and input of amplifier 68. At its right hand middle armature $63^2$, relay 63 will connect the loudspeaker 62 of the called station to the break contact and right hand armature $78^2$ of relay 78 and thence via conductor 108 to a break contact and armature 71*d* of switching relay 71 and there through to output terminal 70 of amplifier 68. This is the branch connection that leads to the loudspeaker 62 via the volume control rheostat 67. The other terminal of loudspeaker 62 is grounded.

The other branch connection may be established to the ungrounded side of loudspeaker 62 via conductor 109, the right hand armature $63^3$ and make contact of relay 63 and the front contact and armature 71*a* of switching relay 71. Connection will be established only when speech is transmitted from the substation, loudspeaker 62 towards the calling staff station. The left hand armature and front contact of relay 63 will connect the winding of this relay direct to conductor 89 and therethrough to the negative pole of the ringing battery to maintain relay 63 energized when key 39 at the calling station is released.

When relay 79 opens its normally closed contact, positive pole of the ringing battery cannot be connected via conductor 88 and armature 80′ and front contact of relay 80 to any of the substations relays 64, 65, etc. or the paging relay 78, thus preventing a master station or another staff station from operating one of the substation relays or the paging relay, should such calling station have its substation key depressed when attempting to call via the common, but now busy, amplifying equipment. The speaking bridge at the calling staff station is connected to the amplifier via conductors 121, 122, armature $59^4$, and make contact of the operated control relay 59 and conductor 106. The loudspeaker at the called station is connected to the amplifier via a right hand middle armature and front contact of relay 63. The talking circuit between the staff station and the called substation in the normal position of the switching relay 71 extends via conductor 106 to the high impedance of 75 ohm winding 76 of transformer 75 which matches the impedance of the staff station. The entire 60 ohms secondary winding 77 of transformer 75 is connected between ground and the armature and back contact 71*a* of relay 71 and thence via armature 71*b* and back contact of the relay, the volume control potentiometer 84, the back contact and armature 71*c* of the switching relay to input terminal 69. The output of amplifier 68 is connected via the armature 71*d* and back contact of the relay and the volume control switch 67 to loudspeaker 62, thus the substation by controlling the rheostat 67 can control the volume at which speech can be received.

Figures 4, 5:
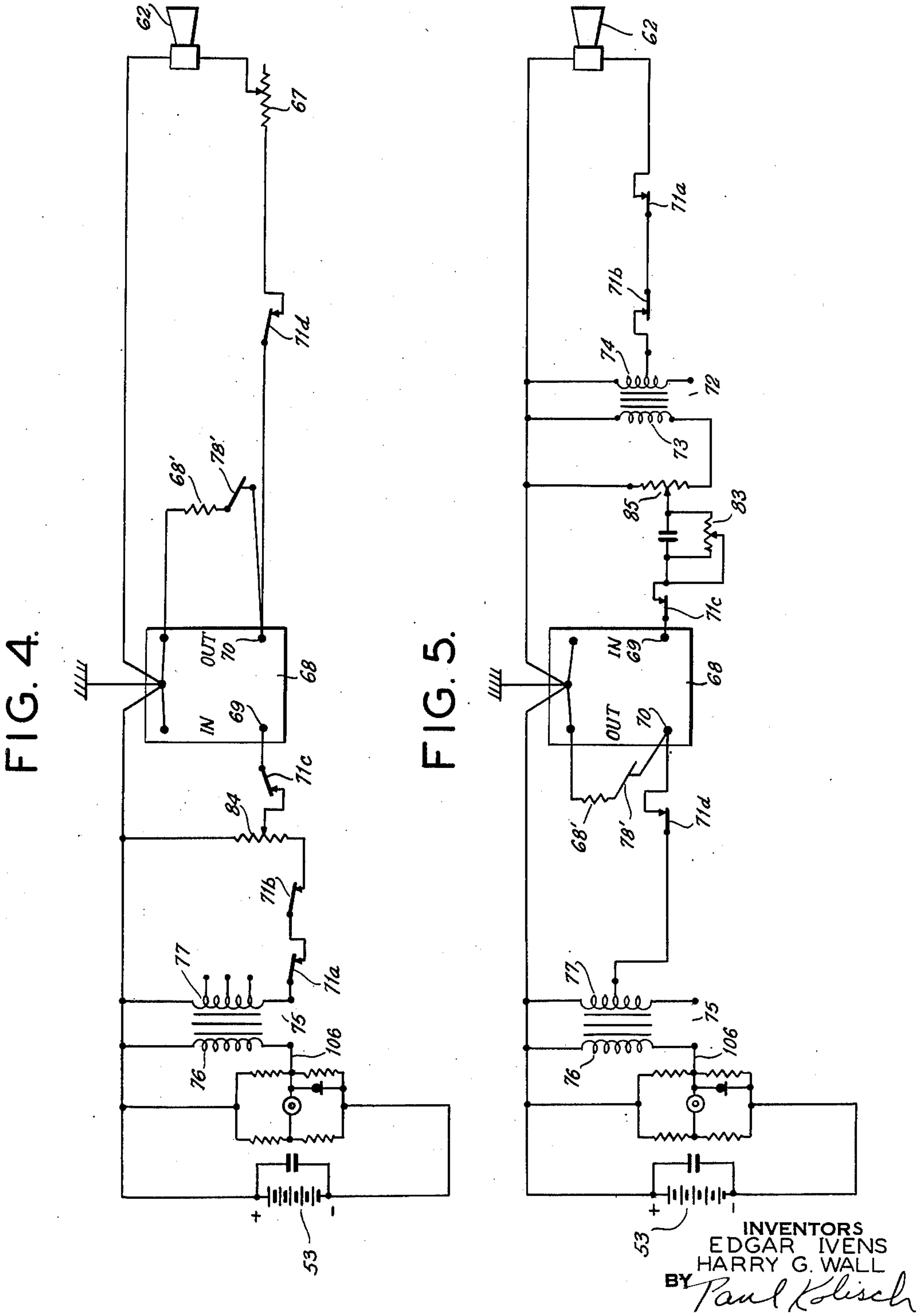
Fig. 4 is a simplified circuit diagram of the talking circuit from a master or staff station to a substation with the control relay normal.
Fig. 5 is a simplified circuit diagram of the talking circuit from a substation to a master or staff station with the control relay operated.

When the talk-listen switch 58 is operated at the staff station, relay 71 becomes energized as above explained and the circuit connections are as shown in Fig. 5. The 75 ohm winding 76 of transformer 75 remains bridged across the calling station, but a 15 ohm path of the secondary winding 77 of this transformer is connected via armature 71*d* and make contact of relay 71 to output terminal 70. The input terminal 69 is connected via armature 71*c* and a make contact of the switching relay, rheostat 83, potentiometer 85 across the entire 60 ohm primary winding 73 of transformer 72. A 15 ohm tap of secondary winding 74 of this transformer is bridged across the substation loudspeaker 62 via make contact and armatures 71*b* and 71*a* of the switching relay. The 15 ohm transformer winding 74 will match the impedance of loudspeaker 62, which it will be noted does not now have in its circuit rheostat 67 and speech can be transmitted from it towards the staff stations.

When it is desired to equip the substations 60 and 61 with a volume control rheostat like 67, then straps 110, 111 connecting the right hand outer armature of substation relay 63, 64 to the stations are removed so that the right hand outer armature of relays 63, 64 are disconnected from the middle armatures of these relays. In view of the removal of these straps the conductor leading to the middle armatures of the substation relays are connected to a rheostat and therethrough to the loudspeaker just as shown at 62, 67.

*Paging*

If a staff station desires paging then the call is initiated as before by removing the handset from its cradle and depressing control key 42. The calling station depresses paging key 41 to operate paging relay 78 over the following circuit: negative pole of the ringing battery 54, conductor 89, bus bar 44, key 41, conductor 112, winding of the paging relay 78 and its right-hand normally closed contact, armature and back contact of relay 79, inner front contact and armature 80′ of relay 80, and conductor 88 back to the positive pole of battery 54. The paging relay becomes energized and locks up in series with relay 79 in the same manner as previously described for substation relay 63. At its right hand middle armature $78^3$ and break contact, relay 78 disconnects the switching relay 71 from conductor 105 to prevent the calling party at the staff station from energizing this relay by accidentally depressing the talk-listen switch 58. At its contact 78′ the paging relay 78 disconnects a dummy load from the circuit of the amplifier output when paging is required. At its righthand outer armature $78^2$, the paging relay connects the loudspeakers at all the substations via the break contacts of their individual relays 63, 64, 65 to conductor 108 and therethrough to the break contact cooperating with armature *71d* of the switching relay and thus to the output of the amplifier. All substations are now connected to the amplifier output and the speaking bridge at the staff station is connected to the input of the amplifier over the path illustrated in Fig. 4. Therefore, the speech at the staff station will be heard at all substations.

The size of amplifier required for an installation, i. e. the number of watts output required, depends on the number of substations in circuit when a calling party pages all substations. If, for instance, twenty-five substations each equipped with a one watt loudspeaker are to be in circuit (in parallel) when paging is in progress, an amplifier of 25 watts output may be required. However, when a calling party calls one substation only, the 25 watt output of the amplifier is too much for only one 1-watt loudspeaker. It is, therefore, necessary to absorb the extra 24 watts by means of a suitable "dummy load" resistance 68′. It is also necessary to provide an arrangement whereby this load is switched in and out of circuit.

As shown in Figs. 4 and 5, the resistance 68′ is connected across the output terminals of amplifier 68 via a break contact and armature 78′ of relay 78. When a calling party originates a paging call, the paging relay 78 operates and, therefore, removes the load 68′ from the output terminals 70.

When a calling party originates a call to one substation, the relay 78 is not energized and, therefore, the dummy load resistance 68′ remains in circuit.

The value of the resistance 68′ obviously depends on the output value of the amplifier which, in turn, is determined by the total wattage of the substations connected in parallel for paging purposes, and the wattage of one substation loudspeaker. Thus, the value of the load resistance 68′ is determined by the characteristics of the particular installation.

*Release*

Upon the completion of the connection to the individual substation or upon the completion of a paging call, the telephone handset at the calling staff station is replaced on its rest and the switch hooks 51 and 52 returned to normal position, thus disconnecting the negative pole of the ringing battery 54 from control relay 59 and busy relay 80 which become de-energized. Relay 80 restores its armature thus permitting the seizure of the common amplifying equipment and it disconnects the positive pole of the ringing battery applied via conductor 88 from the windings of the common substation relay 79 and individual substation relays 63, 64, 65 or paging relay 78 which might have been energized to cause the release of these relays.

All the equipment is now in its normal condition since the restoration of the handset at the staff station restored the last actuated key to its normal condition. A new call may therefore be initiated.

*Calling from master stations to substations*

The operation of the circuits when the call originates at a master station is the same as decribed for the staff stations. The talking circuit once completely established is illustrated in Figs. 4 and 5. The only difference in operation is that a telephone handset 16, 17 at the master station is used for amplified conversation to other substations. Therefore, the substation selecting keys are so arranged that when one of these keys is operated, then the telephone handset is connected with the talking circuit via the bridge 20, 21, 22 and 23. At the master station the negative pole of battery 53 is connected via conductor 101 and the make contact of the fifth blade of the operated substation selecting key, for instance, key 13 to the talking bridge, the other side of which is connected via conductor 100 with the positive pole of the talking battery.

The sixth blade and make contact of the depressed key 13 will also connect the negative pole of ringing battery 54 via conductor 89, conductor 107 to the winding of the relay 63 as previously described for a staff station.

At the master station, it is not necessary to depress a separate key similarly for operating the control relay 30. The winding of this relay is multiplied to the bottom blades of all the substation keys 13, 14, 15 therethrough via the choke coil 87 to the conductor 89, leading to the negative pole of ringing battery 54. Since the other side of the control relay winding is connected with conductor 102 in multiple with the control relay at the staff station, the control relay 30 will become energized and then lock up in the same manner as described in the case when the call was initiated by the staff station. Since the substation key 13, 14 or 15 which is depressed at the master station remains in its operated condition throughout the conversation, the control relay 30 of the master station requires only three armatures in view of the five armatures provided for the staff station control relay. No separate holding circuit need be provided for control relay 30. It will hold up over conductor 103 and the depressed substation selecting key.

Paging under the control of the master station is also performed in substantially the same manner as in the case of the staff station. The paging key is key 15. When this key is depressed, then it will connect the negative pole of the ringing battery 54, via conductor 89, the next to the bottom make contact and contact blade of the switching key 15 to conductor 112 which leads to the winding of the paging relay. This operation will be the same as previously described.

*Busy tone*

When a staff station or a master station attempts to make a call via the common amplifying equipment by depressing the appropriate key, as previously described, then since relay 80 is already energized, the control relay cannot become energized in series with the 1000 ohm resistor 104. The high frequency buzzer which is connected via outer armature $80^2$ and front contact of relay 80 with the primary winding of the transformer 82, will be heard at the calling control station because the secondary of the transformer 82 is connected via conductor 102 over the winding of control relay 30, condenser 127, break contact and blade 30′ of relay 30, the make contact and second blade of key 13 to the master station talking bridge.

If the call was initiated by a staff station, then the circuit would extend via the winding of control relay 59, key 42 which is in contact with bus bar 43, 50 microfarad condenser 123, the normally closed break contacts and armature $59^4$ and thence to the talking bridge at the calling staff station. Thus the sound of the high frequency buzzer will be heard in the telephone handset of the second calling party and will indicate to this calling party that the common equipment is busy. The second calling party should temporarily abandon the call by replacing the telephone handset upon its rest. Should the second calling party depress a substation selecting key, or the paging key, the corresponding substation or paging relays will not operate because as previously pointed out relay 79 connects these relays by its break contact and relay 79 is energized while the first call is occupying the common equipment.

From the foregoing it will be seen that master, staff and substations can be interconnected in a variety of ways to perform many different functions some of which are:

A master station can call any other master station or staff station by means of an audible and a visual signal and it can be called by any other master station or staff station by means of its loudspeaker and can transmit speech to another master station or staff station by means of its fixed transmitter. A master station can also receive and transmit speech to another master or a staff station by means of a telephone handset. A master station can switch off the audible signal so that only the visual signal is received when another master station or staff station calls it.

A master station can converse with a number of staff stations at the same time, i. e. hold so-called conference calls. The master station can use the telephone handset to conduct amplified talk-listen conversation with any one of the substations. The master station can use its telephone handset to page all the substations simultaneously. The master station can converse with all other master stations or staff stations under conditions of complete secrecy. When in conversation with another instrument of any type, the master station can receive visual signals from a calling master station or staff station and can then either accept the call or ignore it.

Should an attempt be made to operate the common equipment shown in Fig. 3 when it is in use, the calling master or staff station will receive an audible signal in its telephone receiver.

A staff station can call a master station by means of an audible or visual signal. It can be called by a master station by means of an audible or a visual signal. It can transmit or receive speech from a master station by means of the telephone handset. The staff station can call another staff station by means of an audible signal and it can be called by another staff station by means of an audible signal. The staff station can transmit and receive speech to and from another staff station by means of a telephone handset. The staff station can use the telephone handset to conduct amplified talk-listen conversation with a substation or it can use its telephone handset to page all substations. The staff stations can converse with all the master stations under conditions of complete secrecy. When in conversation with another instrument of any type, the staff station can also receive visual signals from a calling master station which it can either ignore or accept. A staff station will also receive a busy signal in the telephone receiver when it attempts to connect with the common equipment shown in Fig. 3 when the equipment is busy.

A substation can be voice called by a master station or a staff station. The substation can transmit or receive amplified speech to and from the master station or staff stations by means of a permanent magnet loudspeaker and it can receive also paging calls from the master or staff stations by means of its loudspeaker. If equipped with a volume control rheostat like 67, the substation can control the volume of the incoming speech without affecting the volume of the outgoing speech. If the substation is equipped with a gravity switch like 66, that is to say a switch which normally shortcircuits a resistor 66*a*, such substation can be voice called with loud volume or when the substation is moved, e. g. removed from a hook on which it normally hangs, then the gravity switch 66 is opened and speech can be received at low volume. In such substations the permanent magnet normally provided in the loudspeaker 69 can be used to hold the loudspeaker in place magnetically, by simply applying the loudspeaker to an iron plate.

What is claimed is:

1. In an intercommunicating telephone system, a master and a plurality of substations, said master station having station selecting switches and a talk-listen key, an amplifier having input and output terminals, means including a switching relay having contacts controlling connections to said terminals, a paging relay, a common substation relay and a relay individual to each substation, circuits for the paging relay and the individual substation relays, contacts controlled by the common substation relay controlling said circuits, talking circuit conductors connecting the master station to the input and output terminals of the amplifier, means including the contacts of said switching relay for controlling said talking conductors, means including contacts controlled by the individual substation relays for controlling the talking conductors leading to the substations, means including contacts of the paging relay for controlling the connection of a plurality of substations with the talking conductors, a circuit for the switching relay, and means including the paging relay and the talk-listen key for controlling the last-mentioned circuit.

2. The system according to claim 1, and in which a talking conductor connects an output terminal of the amplifier and the substations, and contacts of the paging relay for controlling said talking conductor.

3. The system according to claim 2, and in which said last-mentioned contacts of the paging relay include a break and a make contact, the break contact connected in multiple to make contacts of all the individual substation relays, and the make contact connected in multiple to break contacts of all the individual substation relays.

4. The system according to claim 1, and contacts controlled by means including the paging relay for connecting a dummy load to the output terminals of the amplifier.

5. In an intercommunicating telephone system, a master and a plurality of substations, said master station having station selecting switches, a paging switch, and a talk-listen key, an amplifier having input and output terminals, means including a switching relay having contacts controlling connections to said terminals, a paging relay, a common substation relay and a relay individual to each substation, a circuit for the paging relay, means including the paging switch and the common substation relay for controlling said circuit, circuits for the individual substation relays, means including the respective station selecting switches and the common substation relay for controlling said circuits, talking circuit conductors connecting the master station to the input and output terminals of the amplifier, means including the switching relay for controlling said talking conductors, means including contacts controlled by the individual substation relays for controlling the talking conductors connecting the substations, means including contacts of the paging relay for controlling the connection of a plurality of substations with the talking conductors, a circuit for the switching relay, and means including the paging relay and the talk-listen key for controlling said last-mentioned circuit.

6. In an intercommunicating telephone system, a plurality of stations, an amplifier having input and output terminals, means for establishing a connection between a calling and a called station, said connection including talking conductors leading from said stations towards said amplifier, means for alternately switching the talking conductors leading to any station to the input and output of the amplifier, at least one talking conductor leading to a station having two branches, and means for allowing the switching of one of said branches only to the output and the other branch only to the input of the amplifier.

7. In an intercommunicating telephone system, a plurality of stations, an amplifier having input and output terminals, means for establishing a connection between a calling and a called station, said connection including talking conductors leading from said stations towards said amplifier, means for alternately switching the talking conductors leading to any station to the input and output terminals of the amplifier, at least one talking conductor leading to a station having two branches, a variable resistor in the first branch, and means for allowing the switching of the first branch only to the output and the second branch only to the input of the amplifier.

8. In an intercommunicating telephone system, a plurality of stations, an amplifier having input and output terminals, means for establishing a connection between a calling and a called station, said connection including talking conductors leading from said stations toward said amplifier, means including a switching relay having make and break contacts for alternately switching the talking conductors leading to any station to the input and output terminals of the amplifier, the last-mentioned means including connections from each of a plurality of stations to break contacts and connections to make contacts of said relay, at least one talking conductor leading to a station having two branches, connections from one of said branches only to break contacts and therethrough to the output of the amplifier, and connections from the other branch only to make contacts of said relay and therethrough to the input of the amplifier.

9. The intercommunicating telephone system according to claim 8, and an individual relay for some of said stations, the individual relays having break contacts connected in multiple in the connection to the amplifier output and make contacts connected in multiple to the input of the amplifier.

10. The system according to claim 9, and a paging relay having a make contact connecting the individual relay break contacts with the amplifier output, and a break contact connecting the amplifier output with make contacts of the individual relays connected in multiple.

11. In a telephone intercommunicating system, a master station and a plurality of substations, means including an amplifier having input and output terminals for establishing a talking connection between the master and any of the substations, means for alternately connecting the talking connection leading to the various stations to the input and output terminals of the amplifier depending on the direction of speech, a transformer in the talking connection leading towards the master station, said transformer having a high impedance winding connected with an input terminal of the amplifier when speech is directed from the master station toward a substation, and a low impedance winding for said transformer connected with an output terminal of the amplifier when speech is directed from a substation towards the master station.

12. In a telephone intercommunicating system, a master station and a plurality of substations, means including an amplifier having input and output terminals for establishing talking connection between the master station and any substation, means for switching the talking connection leading to the various stations alternately to the input and output terminals of the amplifier depending on the direction of speech, a connection from an output terminal to a substation when speech is in the direction of the substation, and a stepup transformer connecting said substation with an input terminal of the amplifier when speech is in the direction of the master station.

13. In a telephone intercommunicating system, a master station and a plurality of substations, means including an amplifier for establishing a connection between the master station and the substations, said amplifier having input and output terminals, means for alternately switching the master and substations to the input and output terminals of the amplifier depending on the direction of the conversation, a transformer having cooperating high impedance windings connected with the master station and an input terminal of the amplifier, respectively, one of the windings having a low impedance tap connected with an output terminal of the amplifier, and a second transformer having a high impedance winding connected with an input terminal of the amplifier, and a cooperating low impedance winding connected with a substation.

14. In an intercommunicating telephone system, a master and a plurality of substations; said master station having a telephone set, switches controlled thereby, a plurality of keys including a selecting key for each substation, and a talk-listen key; at each substation a loudspeaker operable as a microphone and receiver and a relay individual to the substation; common equipment for all said stations including an amplifier having input and output terminals, a switching relay, a paging relay, and a common substation relay; circuits for the paging relay, and the individual substation relays, means including the common substation for controlling each of the last-mentioned circuits; talking circuit conductors connecting the master station to the input and ouput terminals of the amplifier, means including the switching relay for controlling said talking conductors; means including contacts controlled by the individual substation relays for controlling the talking conductors connecting the substations; means including contacts of the individual relays of a plurality of substations for controlling the connection of said plurality of substations with the talking conductors; a circuit for the switching relay, and means including contacts of the paging relay and the talk-listen key of the master station for controlling said circuit and to operate said switching relay alternately to connect the talking conductors connecting the master station and the substations to the input or the output terminals of the amplifier.

15. In an intercommunicating telephone system, a master and a plurality of substations; said master station having a telephone set, switches controlled thereby, a plurality of keys including a selecting key for each substation, a paging key, and a talk-listen key; at each substation a loudspeaker operable as a microphone and receiver and a relay individual to the substation; common equipment for all said stations including an amplifier having input and output terminals, a switching relay, a paging relay, and a common substation relay; a circuit for the paging relay, means including the paging key and the common substation relay for controlling said circuit, circuits for the individual substation relays, means including the selecting keys, the paging relay and the common substation relay for jointly controlling the circuits; talking circuit conductors connecting the master station to the input and output terminals of the amplifier, means including said paging and switching relays for controlling said talking conductors; means including contacts controlled by the individual substation relays for controlling the talking conductors connecting the substations; means including contacts of the individual relays of a plurality of substations and of the paging relay for controlling the connection of said plurality of substations with the talking conductors; a circuit for the switching relay, and means including contacts of the paging relay and the talk-listen key of the master station for controlling said circuit and to operate said switching relay alternately to connect the talking conductors connecting the master station and the substations to the input or the output terminals of the amplifier.

16. In an intercommunicating telephone system, a plurality of master and substations; at each master station a telephone set, switches controlled thereby, a control relay, a plurality of keys including station selecting keys, and a talk-listen key connected to a contact, means including the associated control relay for controlling said contact; at each substation a relay individual to the substation; common equipment for all said stations including an amplifier having input and output terminals, a switching relay, a busy relay, a paging relay, and a common substation relay; a circuit for the control relay for controlling said circuit of a calling master station, means including contacts of a key at the master station and of the busy relay for controlling said circuit; a circuit for the busy relay, means including a contact of the calling control relay for controlling said circuit; means responsive to the actuation of the busy relay to prevent the operation of a second control relay; circuits for the paging relay and the individual substation relays, each of the last-mentioned circuits controlled by means including the common substation relay and the busy relay; talking circuit conductors connecting the master stations to the input and output terminals of the amplifier, means including the switching relay for controlling said talking conductors; means including contacts controlled by the control relays associated with the master stations controlling talking conductors leading to the latter; means including contacts controlled by the individual substation relays for controlling the talking conductors leading to the substations; means including contacts of the individual relays of a plurality of substations and of the paging relay for controlling the connection of said plurality of substations with the talking conductors; a circuit for the switching relay, and means including contacts of the paging and the control relays and the talk-listen key of the calling master station for controlling said circuit and to operate said switching relay alternately to connect the talking conductors leading towards the master station and the substations to the input or the output terminals of the amplifier.

17. In an intercommunicating telephone system, a plurality of master and substations; at each master station a telephone set, switches controlled thereby, a control relay, a plurality of keys including station selecting keys, a paging key and a talk-listen key connected to a contact controlled by the associated control relay; at each substation a relay individual to the substation; common equipment for all said stations including an amplifier having input and output terminals, a switching relay, a busy relay, a paging relay, and a common substation relay; a circuit for the control relay of a calling master station, means including contacts of the paging key at the master station and of the busy relay for controlling said circuit; a circuit for the busy relay, means including a contact of the calling control relay for controlling said circuit; means responsive to the actuation of the busy relay to prevent the operation of a second control relay; circuits for the paging relay and the individual substation relays, each of the last-mentioned circuits controlled by means including the corresponding key at the calling master station, and by the common substation relay and the busy relay; talking circuit conductors connecting the master stations to the input and output terminals of the amplifier, means including the switching relay for controlling said talking conductors; means including contacts, controlled by the control relays associated with the master stations and by the paging relay, controlling talking conductors leading to the latter; means including contacts controlled by the individual substation relays for controlling the talking conductors leading to the substations; means including contacts of the individual relays of a plurality of substations and of the paging relay for controlling the connection of said plurality of substations with the talking conductors; a circuit for the switching relay, means including contacts of the paging and the control relays and the talk-listen key of the calling master station for controlling said circuit and to operate said switching relay alternately to connect the talking conductors leading towards the master station and the substations to the input or the output terminals of the amplifier.

18. In an intercommunicating telephone system, a plurality of master and substations; at each master station a telephone set, switches controlled thereby, a control relay, a plurality of keys including a selecting key for each master and substation and a talk-listen key connected to a contact controlled by means including the associated control relay; at each substation a loudspeaker operable as a microphone and receiver and a relay individual to the substation; common equipment for all said stations including signaling means, means coupling the signaling means in multiple to contacts controlled by means including the control relays and thence to the telephone set of the calling master station via contacts controlled by selecting keys of the telephone set switch, an amplifier having input and output terminals, a switching relay, a busy relay, a paging relay, and a common substation relay; a talking circuit between the calling and called master stations including contacts controlled by means including the telephone set switches at both stations and the operated selecting key at the calling master station; a circuit for the control relay of a calling master station, means including contacts of a key at the master station and of the busy relay for controlling said circuit; a circuit for the busy relay, means including a contact of the calling control relay for controlling said circuit; means responsive to the actuation of the busy relay to prevent the operation of a second control relay, a circuit for the busy signal controlled by means including the busy relay; circuits for the paging relay and the individual substation relays, each of the last-mentioned circuits controlled by means including the common substation relay and the busy relay; talking circuit conductors connecting the master stations to the input and output terminals of the amplifier, means including the switching relay for controlling said talking conductors; means including contacts controlled by the control relays associated with the master stations controlling talking conductors leading to the latter; means including contacts controlled by the individual substation relays for controlling the talking conductors leading to the substations; means including contacts of the individual relays of all the substations and the paging relay for connecting all the substations with the talking conductors; a circuit for the switching relay, means including contacts of the paging relay and the control relay and the talk-listen key of the calling master station for controlling said circuit, the contacts of said switching relay being connected alternately to connect the talking conductors leading towards the master station and the substations to the input or the output terminals of the amplifier.

19. In an intercommunicating telephone system a plurality of master and substations; at each master station a receiver, a transmitter connected to the receiver, a battery, a circuit for connecting the battery to said transmitter; at each substation a transducer acting either as loudspeaker or self-energizing transmitter; means for connecting intercommunicating lines to any station; means including an amplifier having input and output terminals for establishing a connection between the master and any of the substations; means including a switching relay for alternately switching the intercommunicating lines to the input and output of the amplifier; means including a key at each master station controlling said relay, and a circuit for said switching relay including the key and battery.

20. In an intercommunicating telephone system, a plurality of master and substations, means for connecting intercommunicating lines to the stations; at each master station a receiver, a transmitter, a battery, a bridge circuit for said transmitter, said bridge being substantially balanced and comprising four impedance legs with said battery connected across one diagonal of the bridge, the transmitter connected in parallel with one leg, the receiver connected across the second diagonal; an intercommunication line connecting the junction point of the receiver and the transmitter; means including an amplifier having input and output terminals for establishing a connection between the master and any of the substations, means including a switching relay for alternately switching the connections to the input and output terminals of the amplifier, said relay connected to one pole of the battery; means including a key at each master station connected to the other pole of said battery, and a connection between the key and the relay to complete the circuit for said switching relay.

21. An intercommunicating telephone system, a plurality of master and substations, means for connecting intercommunication lines to the stations; a first and second battery; at least one receiver at each master station; a transmitter connected to the receiver and fed by one of said batteries; selecting switches and a talk-listen key; means including an amplifier having input and output terminals for establishing a connection between the master and any of the substations, said connection including talking conductors leading from said stations toward said amplifier, means including a switching relay controlling connections to said terminals; a common substation relay and a relay individual to each substation; circuit means for controlling the individual substation relay by the common substation relay; a control relay individual to each master and associated with the talk-listen key; means for controlling circuits supplied by one of said batteries including a first selecting switch, contacts of the control relay, contacts of the selected substation relay and the talk-listen key for said switching relay; circuits supplied by the other battery for feeding a transmitter of a calling and called master station over a second talking circuit, controlled by means including a second selecting switch; and means operable thereupon to maintain the circuits supplied by the first battery open.

EDGAR IVENS.
HARRY G. WALL.

REFERENCES CITED

The following references are of record in the file of this patent:

UNITED STATES PATENTS

| Number | Name | Date |
|---|---|---|
| 2,162,369 | Campbell | June 13, 1934 |
| 2,249,456 | Campbell | July 15, 1941 |
| 2,317,358 | Campbell | Apr. 27, 1943 |
| 2,347,079 | Campbell | Apr. 18, 1944 |